(12) United States Patent
Wang et al.

(10) Patent No.: US 8,446,939 B2
(45) Date of Patent: May 21, 2013

(54) CHANNEL QUALITY ESTIMATION FOR MLSE MIMO RECEIVER

(75) Inventors: Yi-Pin Eric Wang, Fremont, CA (US); Jung-Fu Cheng, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 387 days.

(21) Appl. No.: 12/764,247

(22) Filed: Apr. 21, 2010

(65) Prior Publication Data

US 2011/0261872 A1 Oct. 27, 2011

(51) Int. Cl.
 *H04B 3/46* (2006.01)
 *H04B 17/00* (2006.01)
 *H04Q 1/20* (2006.01)

(52) U.S. Cl.
 USPC ............ 375/227; 375/285; 375/340; 375/346

(58) Field of Classification Search
 USPC ................. 375/224, 227, 259–260, 285, 340, 375/346, 348, 349
 See application file for complete search history.

(56) References Cited

U.S. PATENT DOCUMENTS

| | | | | |
|---|---|---|---|---|
| 6,034,952 | A * | 3/2000 | Dohi et al. ..................... | 370/335 |
| 2003/0103584 | A1 * | 6/2003 | Bjerke et al. .................. | 375/340 |
| 2004/0100897 | A1 * | 5/2004 | Shattil ........................... | 370/206 |
| 2004/0146024 | A1 * | 7/2004 | Li et al. ......................... | 370/334 |
| 2005/0008092 | A1 * | 1/2005 | Kadous ......................... | 375/267 |
| 2005/0276348 | A1 * | 12/2005 | Vandenameele .............. | 375/299 |
| 2005/0282500 | A1 | 12/2005 | Wang et al. | |
| 2008/0293371 | A1 | 11/2008 | Kishigami et al. | |
| 2008/0300004 | A1 * | 12/2008 | Balachandran et al. ...... | 455/522 |
| 2011/0105039 | A1 * | 5/2011 | Heiman et al. ............... | 455/63.1 |
| 2012/0033618 | A1 * | 2/2012 | Wallace et al. ............... | 370/328 |

FOREIGN PATENT DOCUMENTS

WO WO 2006/069397 A2 6/2006

OTHER PUBLICATIONS

Abe et al.: "Effective SINR Computation for Maximum Likelihood Detector in MIMO Spatial Multiplexing Systems", IEEE Global Telecommunications Conference—Globecom 2009,Nov. 30, 2009, pp. 1-5, XP031646412, NJ, USA ISBN: 978-1-4244-4148-8.

* cited by examiner

*Primary Examiner* — Jean B Corrielus

(57) ABSTRACT

A receive signal processor jointly detects two or more symbols in a signal-of-interest in the presence of one or more other MIMO signals. The signal-to-interference-plus-noise ratio for each signal-of-interest is determined by computing per-subcarrier signal-to-interference-plus-noise ratios for a plurality of subcarriers allocated to the signals-of-interest, and computing a total signal-to-interference-plus-noise ratio for the subcarriers based on the per-subcarrier signal-to-interference-plus-noise ratios of the subcarriers. A controller determines one or more transmission formats for uplink transmissions based on the signal-to-interference-plus-noise ratios. The process of computing per-subcarrier signal-to-interference-plus-noise ratio reflects the amount of MIMO interference already cancelled or still remaining in the signal arriving at the joint detector.

24 Claims, 4 Drawing Sheets

CHANNEL QUALITY ESTIMATION FOR MLSE MIMO RECEIVER

BACKGROUND

The present invention relates generally to signal quality estimation in a mobile communication network and, more particularly, to signal quality estimation for the uplink in LTE systems.

Long Term Evolution (LTE) systems use single-carrier frequency-division multiple-access (SC-FDMA) for uplink transmissions. The use of single carrier modulation for the uplink is motivated by the lower peak-to-average ratio of the transmitted signal compared to conventional OFDM, which results in higher average transmit power and increased power amplifier efficiency. The use of SC-FDMA in the uplink, however, gives rise to an inter-symbol interference (ISI) in dispersive channels. It is important to mitigate the effects of ISI so that SC-FDMA can improve power amplifier efficiency without sacrificing performance.

Linear minimum mean square error (LMMSE) receivers in the base station (also known as an eNodeB) can suppress ISI using linear frequency domain equalization. LMMSE receivers are designed to maximize the signal-to-interference-plus-noise ratio (SINR) for each subcarrier component. Though LMMSE improves performance significantly beyond a simple match filtering receiver, further improvements in performance could be obtained with advanced receivers using techniques such as Turbo Soft Interference Cancellation (TuboSIC), or near maximum-likelihood detectors, such as a reduced state sequence estimator (RSSE), Serial Localization with Indecision (SLI) and Assisted Maximum Likelihood Detector (AMLD). These advance receivers are expected to achieve performance very close to the performance of a maximum-likelihood detector.

One problem encountered with the deployment of advanced receivers is obtaining reliable channel quality indication (CQI) estimation and modulation and coding scheme (MCS) selection. CQI estimates are used, for example, for link adaptation and scheduling in the uplink of LTE. Currently, there is no solution for CQI estimation for RSSE, SLI, MLD, or other ML, or near ML, receiver in the uplink in LTE systems.

SUMMARY

The present invention relates to the estimation of signal-to-interference-plus-noise ratios in multi-user receivers using ML or near ML detectors for the uplink of an LTE system. The embodiments of the present invention enable more accurate CQI estimation and MCS selection for multi-user single input, multiple output (MU-SIMO), single user multiple input, multiple output (SU-MIMO), and multiple user multiple input, multiple output (MU-MIMO) uplinks in LTE. The present invention can be applied to scheduling multiple uplink transmissions on the same frequencies (i.e., multi-user MIMO).

On exemplary embodiment of the invention comprises a method of determining a transmission format for uplink transmissions over a MIMO channel. One exemplary method comprises receiving two or more signals of interest over a multiple-input, multiple-output channel; iteratively detecting each signal-of-interest by successive interference cancellation and jointly detecting symbols within each signal-of-interest; and computing a signal-to-interference-plus-noise ratio for each signal-of-interest reflecting the remaining interference after cancellation of interference attributable to previously detected signals-of-interest. The signal-to-interference-plus-noise ratio may be computed by computing per-subcarrier signal-to-interference-plus-noise ratios for a plurality of subcarriers allocated to the signal-of-interest; and computing a total signal-to-interference-plus-noise ratio for the signal-of-interest based on the per-subcarrier signal-to-interference-plus-noise ratios of the subcarriers. The computed signal-to-interference-plus-noise ratios for the signals-of-interest are used to determine transmission formats for uplink transmissions.

Another exemplary embodiment of the invention comprises a receive signal processor for a communications device having one or more receive antennas. The receive signal processor comprises a detector to iteratively detect two or more signals-of-interest received over a multiple-input, multiple-output channel, and a signal quality estimator to compute a signal-to-interference-plus-noise ratio for the signal-of-interest reflecting the remaining interference after cancellation of interference attributable to the previously detected signals-of-interest. The detector jointly detects the symbols in each signal-of interest and then cancels the interference attributable to the detected signal-of-interest from the received signal until the last signal-of-interest is detected. The signal quality estimator is configured to compute per-subcarrier signal-to-interference-plus-noise ratios for a plurality of subcarriers allocated to the signal-of-interest; and compute a total signal-to-interference-plus-noise ratio for the subcarriers based on the per-subcarrier signal-to-interference-plus-noise ratios of the subcarriers.

DETAILED DESCRIPTION

Figure 1:
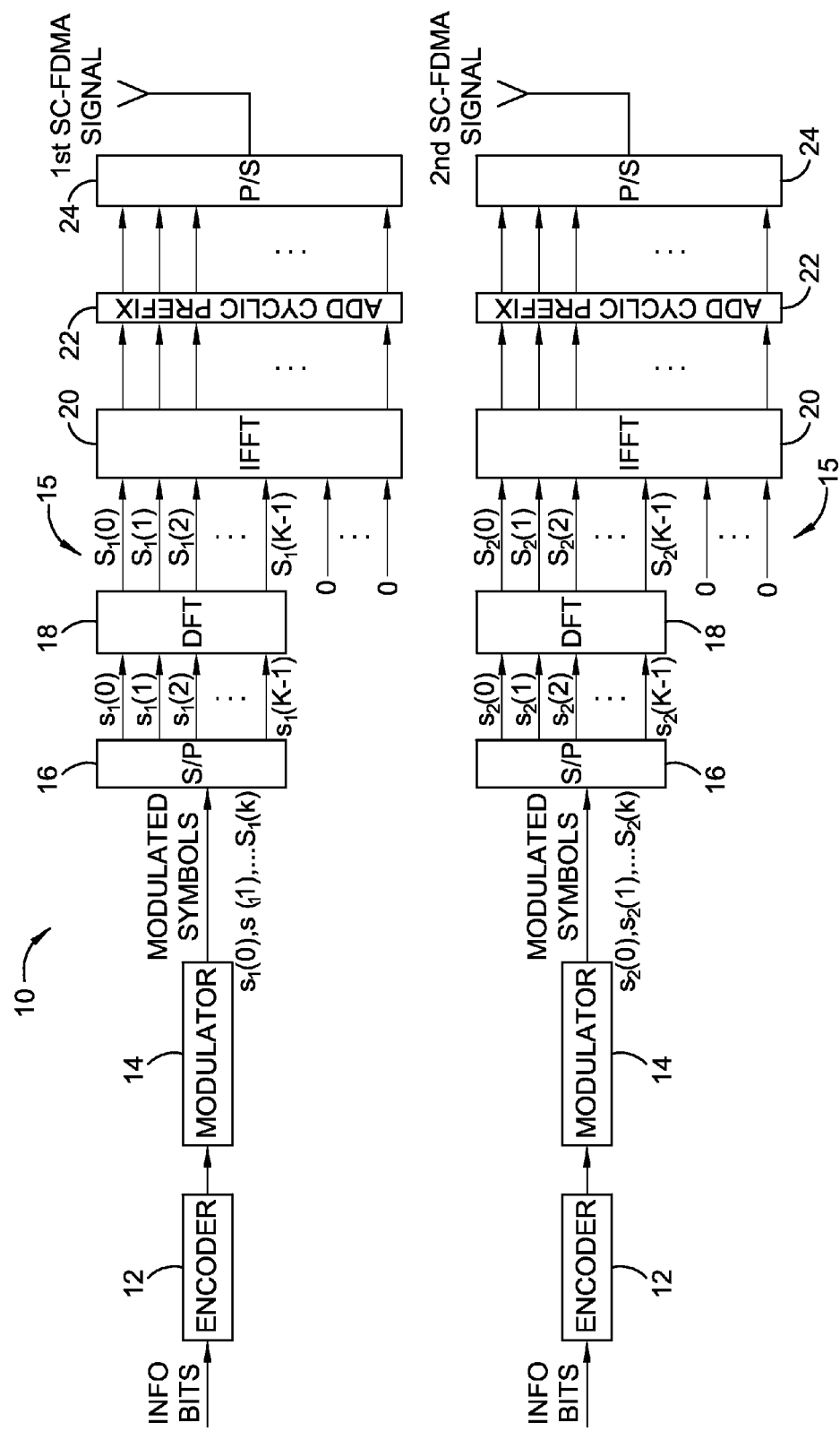
FIG. 1 illustrates an exemplary block diagram of a MIMO transmitter.

Referring now to the drawings, FIG. 1 illustrates an exemplary MIMO transmitter 10 for generating SC-FDMA signals. An information bit stream is divided into two or more streams corresponding to the number of transmit antennas. Each bit stream is encoded in a channel encoder 12 (e.g., Turbo encoder) to produce a coded bit stream. The coded bit streams are modulated by modulators 14 (e.g., QAM) to generated time domain modulation symbol streams $s_n(0)$, $s_n(1), \ldots, s_n(K-1)$. Each modulated symbol stream is applied to a SC-FDMA transmitter 15 comprising a serial-to-parallel (S/P) converter 16, a discrete Fourier transform (DFT) unit 18, an inverse fast Fourier transform (IFFT) unit 20, a cyclic prefix adder 22, and a parallel-to-serial (P/S) converter 24. Serial-to-parallel converter 16 converts a serial stream of time-domain modulated symbols $s_n(0), s_n(1), \ldots, s_n(K-1)$ to a parallel substreams. DFT 20 converts the time-domain modulated symbols to frequency-domain symbols $S_n(0)$, $S_n(1), \ldots, S_n(K-1)$. As a result, each frequency-domain symbol is a function of all time-domain symbols in the input symbol stream. IFFT 20 applies an inverse Fourier transform to the frequency-domain symbols, cyclic prefix adder 22 adds a cyclic prefix to the IFFT output, and parallel-to-serial converter 24 converts the parallel symbols into a serial SC-FDMA signal stream. In frequency-selective channels, the time-domain symbols cannot be separated, interference-free, through linear equalization and IFFT. In this situation, ML or near-ML detectors that jointly detect the time-domain symbols $s_n(0), s_n(1), \ldots, s_n(K-1)$ offer performance improvement. Although FIG. 1 illustrates a separate encoder 12 and modulator 16 for each information bit stream, it will be appreciated that the information bit stream could be encoded and modulated prior to being divided.

Figure 2:
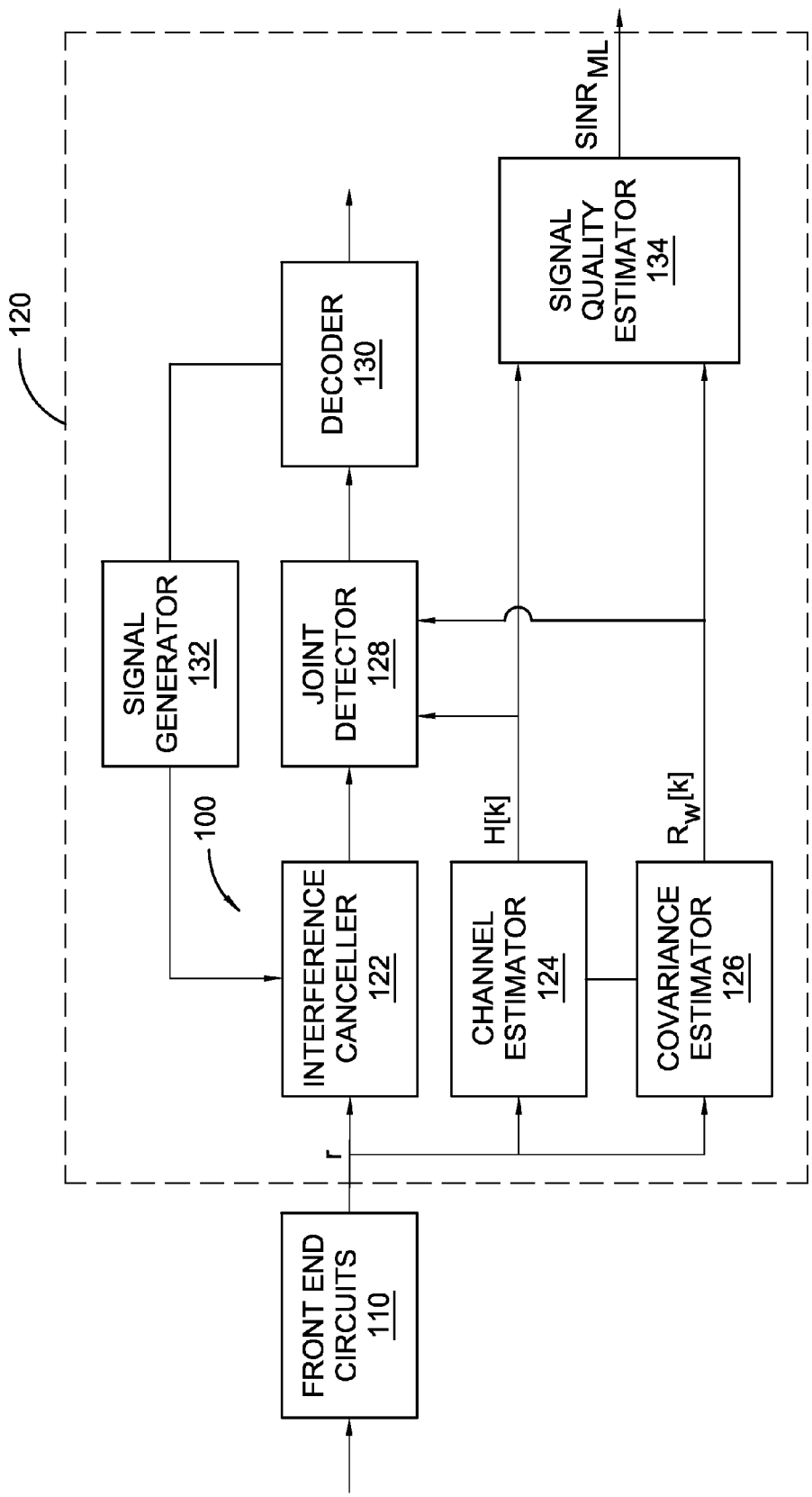
FIG. 2 illustrates an exemplary receiver according to one embodiment of the present invention using a maximum likelihood (ML) or near ML detector to jointly detect a signal-of interest with one or more other signals.

FIG. 2 illustrates an exemplary receiver 100 according to one embodiment of the present invention. The receiver 100 includes front end circuits 110 and a receive signal processor 120. The front end circuits 110 downconvert the received signal to baseband frequency, amplify and filter the received signal, and convert the received signal to digital form for input to the receive signal processor 120. The main purpose of the receive signal processor 120 is to demodulate and decode a plurality of signals-of-interest.

In one embodiment of the invention, the receive signal processor 120 uses a multi-user detection (MUD) to detect a plurality of signals-of-interest. As used herein, the term multi-user includes the case where a single user is transmitting multiple streams, which from the perspective of the receiver, is the same as multiple users. Thus, the signals-of-interest may comprise signals from two or more different users, or multiple signals for a single user, or some combination thereof.

The exemplary receive signal processor 120 employs successive interference cancellation (SIC) to successively demodulate and decode the signals-of-interest contained in the received signal. The receive signal processor detects the signals-of-interest one at a time. After a signal is detected, the interfering signal can be recreated at the receiver using knowledge of the channel and subtracted from the received signal. This process is repeated successively, for each signal-of-interest, and progressively reduces the interference as each of the signals-of-interest is detected. Typically, the strongest signal is detected first and canceled from the received signal, which mitigates the interference for weaker signals.

The main functional components of the receive signal processor 120 comprise an interference canceller 122, channel estimator 124, impairment covariance estimator 126, joint detector 128, decoder 130, signal generator 132, and signal quality estimator 134. The functional components of the receive signal processor 120 may be implemented by one or more microprocessors, hardware, firmware, or a combination thereof.

The received signal is input to the interference canceller 122. The interference canceller 122 iteratively subtracts estimates of previously detected signals-of-interest from the received signal to generate a modified received signal for input to the joint detector 128. During the initial iteration, the received signal is fed unchanged to the joint detector 128. For each subsequent iteration, the detected signal from the previous iteration is fed back to the signal generator 132 to regenerate an estimate of the interference attributable to the detected signal. The interference estimate is subtracted from the received signal by the interference canceller 122. This process is repeated until all of the signals-of interest have been detected.

The channel estimator 124 generates an estimate of the channel from one or more transmit antennas at a transmitting station (not shown) to one or more receive antennas (not shown) using any known channel estimation techniques. Typically, pilot symbols are used in the channel estimation process; however, data symbols could also be used as effective pilot symbols to improve channel estimation. The channel estimate produced from the pilot signal should be scaled appropriately to account for the power difference between pilot symbols and data symbols. The impairment covariance estimator 126 uses the channel estimates from the channel estimator 124 to estimate the covariance of the signal impairments, such as multi-user interference, self interference, other-cell interference, and noise, in the signals-of-interest. A new channel estimate and impairment covariance estimate is generated after each iteration. The channel estimates and impairment covariance estimates are input to the joint detector 128, which uses the impairment covariance estimates along with the channel estimates to detect one of the signals-of-interest in the received signal. The channel estimates and impairment covariance are also used by the signal estimator 134 to generate estimates of the signals-of-interest.

The joint detector 128 preferably comprises an ML detector or near ML detector, such as a reduced state sequence estimator, SLI detector or AMLD detector. The joint detector 128 jointly processes symbols in each signal-of-interest contained in the received signal and generates received symbol estimates for each signal-of-interest. The received symbol estimates are demodulated to form received bit soft values that are then fed to a decoder 130. The decoder 130 detects errors that may have occurred during transmission and outputs an estimate of a transmitted information sequence.

The signal quality estimator 134 estimates the signal-to-interference-plus-noise ratios (SINR) for the signals-of-interest. The SINR estimates may then be used to generate a channel quality indications (CQI), or modulation and coding scheme (MCS) selections. The CQI and/or MCS values may be reported to the transmitting station for link adaptation and/or scheduling. Therefore, reliable estimates of the SINR estimates are needed. Techniques are known for computing reliable SINR estimates for linear minimum means squared error (LMMSE) receivers for uplink in LTE systems. However, there are currently no known techniques for producing reliable SINR estimates for ML or near ML detectors for the uplink in LTE.

Figure 3:
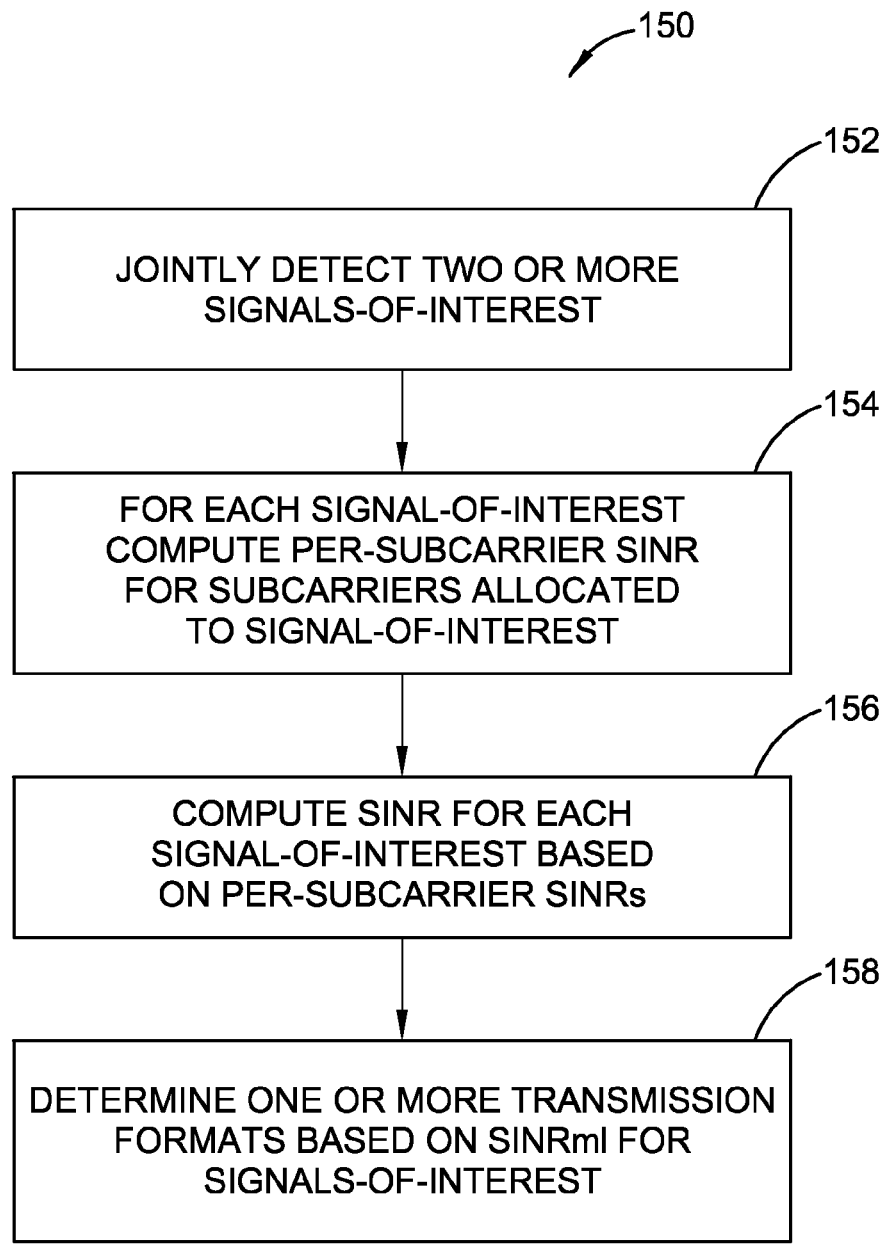
FIG. 3 illustrates an exemplary method implemented by the receiver for computing a signal-to-interference-plus-noise ratio of the signal-of-interest detected using an ML or near-ML detector.

The signal quality estimator 134 according to embodiments of the present invention is able to produce reliable SINR estimates for single input/single output (SISO) and single input/multiple output (SIMO) systems. FIG. 3 illustrates a method 150 according to one exemplary embodiment of the invention for generating SINR estimates for a signal-of-interest transmitted over an OFDM carrier. It is presumed that each signal-of-interest is transmitted from a single transmit antenna to one or more receive antennas. A single transmit antenna may be a single virtual transmit antenna which consists of a number of physical antennas. The signals-of interest can originate from multiple users or a single user. In the example, below, it is presumed that the signals-of-interest are received on multiple receive antenna.

The signals-of interest are detected successively by an SIC receiver as previously described (block 152) The SINR estimator 134 first computes a SINR estimate for each signal-of-interest. To compute SINR for a given signal-of interest, the SINR estimator 134 computes a per-subcarrier SINR estimate for each subcarrier allocated to the signal-of-interest (block 154). The SINR estimator then combines the per-subcarrier SINR estimates to obtain the final SINR estimate for the signal-of-interest (block 156). The SINR estimates for the signals-of-interest can then be used to select a transmission format (MCS value) and/or to compute a CQI (block 158).

In one exemplary embodiment, the per-subcarrier SINR estimate for the nth signal-of-interest, denoted $SIR[k]_n$, is computed according to:

$$SINR[k]_n = E_{s,n} H_n^H[k] R_{w,n}^{-1}[k] H_n[k] \quad \text{Eq. (1)}$$

where K is the total number of sub-carriers corresponding to the uplink spectrum allocation and k indexes the subcarriers, $E_{s,n}$ is the symbol energy of the nth signal-of interest, $H_n[k]$ is the channel response vector collecting the frequency responses of the kth sub-carrier from the corresponding transmit antenna to all M receive antennas, $H_n^H$ is the Hermetian transpose of the channel response vector, and $R_{w,n}[k]$ is the total impairment covariance at the kth sub-carrier. The channel response vector is given by:

$$H_n[k] = \begin{bmatrix} H_{0,n}[k] \\ H_{1,n}[k] \\ \vdots \\ H_{M-1,n}[k] \end{bmatrix} \quad \text{Eq. (2)}$$

The impairment covariance matrix $R_{w,n}[k]$ may be computed according to:

$$R_{w,n}[k] = R_w[k] + \sum_{j=n+1}^{N-1} E_{s,j} H_j[k] H_j^H[k] \quad \text{Eq. (3)}$$

where $$\sum_{j=n+1}^{N-1} E_{s,j} H_j[k] H_j^H[k]$$

is the covariance of the interference from other signals-of-interest that remain in the received signal, and $R_{w,n}[k]$ is the M×M matrix accounting for the noise and other cell interference covariance at the kth sub-carrier. In cases where the noise and other cell interference are uncorrelated across different antennas, $R_{w,n}[k]$ takes the form of a diagonal matrix.

After the per-subcarrier SINR is obtained, the signal quality estimator 134 computes a total SINR for the signal-of interest based on the per-subcarrier SINR estimates. More specifically, the signal quality estimator 134 computes a per subcarrier capacity $C_{k,n}$ for the subcarriers allocated to the signal-of-interest. The per-subcarrier capacity $C[k]_n$ for a given subcarrier k is computed according to:

$$C[k]_n = \log(1 + SINR[k]_n) \quad \text{Eq. (4)}$$

The base of logarithm in the above capacity computation is 2 or other values. The per-subcarrier capacities $C_k$ for the sub-carriers allocated to the signal-of-interest are then summed and averaged by the signal quality estimator 134 to compute an average SINR given by:

$$C_{AVG,n} = \frac{1}{K} \sum_{k=0}^{K-1} C[k]_n \quad \text{Eq. (5)}$$

The average capacity $C_{AVG}$ is then used to compute $SINR_{MLD}$ of the signal-of-interest for a ML detector or near ML detector according to:

$$SINR_{MLD,n} = \exp(C_{AVG,n}) - 1 \quad \text{Eq. (6)}$$

Combining Eqs. 1-6, the $SINR_{MLD}$ for the signal-of-interest is given by:

$$SINR_{MLD,n} = \exp\left( \frac{1}{K} \sum_{k=0}^{K-1} \log\left( 1 + E_{s,n} H_n^H[k] \left( R_w[k] + \sum_{j=n+1}^{N-1} E_{s,j} H_j[k] H_j^H[k] \right)^{-1} H_n[k] \right) \right) - 1 \quad \text{Eq. (7)}$$

The exp(x) and log(x) functions in Eq. (7) may, in some embodiments, be replaced by linear approximations or look-up tables.

As previously described, the $SINR_{MLD}$ may be used to generate a channel quality indication (CQI) and/or MCS (modulation and coding scheme) value to be reported to the transmitting station for link adaptation and/or scheduling. In SU-MIMO system, where the transmissions of the signals-of-interest originate from different users, the MCS/CQI to be reported for each signal-of interest can be obtained from a mapping function given by:

$$MCS_n = MCSFormat(SINR_{MLD,n}) \quad \text{Eq. (8)}$$

Figure 4:
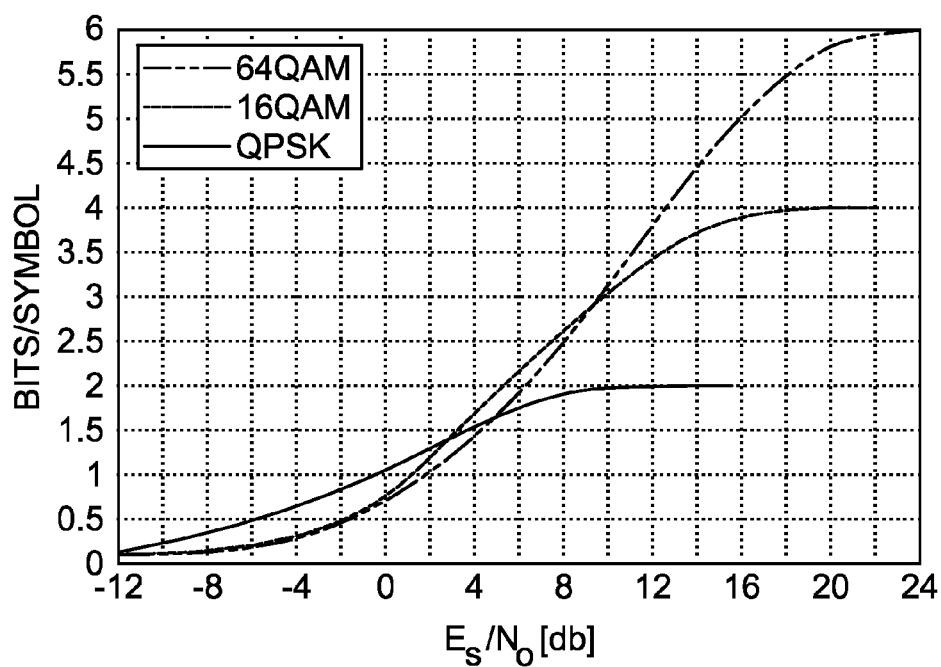
FIG. 4 illustrates a mapping function for translating a computed signal-to-interference-plus-noise ratio into a desired information rate and modulation scheme.

FIG. 4 illustrates one exemplary mapping function for translating $SINR_{MLD,n}$ to a target information rate and modulation scheme. If the modulation order is pre-determined, the MCS-Format function takes the information rate corresponding to the modulation order at the calculated $SINR_{MLD,n}$ value. Alternatively, the MCSFormat function takes the highest information rate amongst the permitted modulation orders. That is, the modulation order is also dynamically and implicitly selected by the MCSFormat function. Such MCSFormat function can also be implemented as a look-up table stored in a retrievable storage/memory medium. More generally, to conserve MCS/CQI signaling bandwidth requirements, the MCSFormat transformation involves quantization of the SINR, which results in a look-up table with small number of entries.

Further adjustments can be applied to $SINR_{MLD,n}$ for link adaptation purposes. As non-limiting examples, such adjustments are typically applied to account for different quality of service requirements, losses induced by implementation imperfection, and channel quality variations within scheduling latency. To account for such variations, the mapping function for translating the $SINR_{MLD,n}$ to MCS/CQI becomes:

$$MCS_n = MCSFormat(SINR_{MLD,n} - \delta_n) \quad \text{Eq. (9)}$$

where $\delta_n$ is the said SINR adjustment for the nth signal-of-interest. In one embodiment, the adjustments are dependent on the processing order in the SIC receiver to mitigate effects of potential error propagation. Decoding failures or errors in the signals that are processed earlier can increase the interference levels for the signals that are processed later. To minimize such error cases, it is advantageous to increase the error and interference resilience of the signals to be processed early in the SIC receiver by assigning decreasing values of the SINR adjustments ($\delta_0 \geq \delta_1 \geq \ldots \geq \delta_{N-1}$).

For SU-MIMO systems, the N signals-of-interest are transmitted by a single user from an equal number of transmit antennas using K subcarriers. Depending on the system specifications, the N MCS/CQI values may be translated into N MCS/CQI values, one MCS/CQI value or L MCS/CQI values (with L<N).

In the first case (separate MCS/CQI values), the N MCS/CQI values can be obtained by applying the MCSFormat mapping function to the N $SINR_{MLD,n}$ values individually as shown in Eq. (9) or Eq. (10).

In the second case (only one MCS/CQI value), the $SINR_{MLD,n}$ values may be combined into a single MCS/CQI value according to:

$$MCS = JointMCSFormat(SINR_{MLD,0}, \ldots, SINR_{MLD,N-1}) \qquad \text{Eq. (10)}$$

If the modulation order is pre-determined, the JointMCSFormat mapping function takes the information rate corresponding to the modulation order at the calculated $SINR_{MLD,n}$ value. Alternatively, full flexibility to use different modulation orders on different transmit antennas can also be supported. However, to conserve MCS/CQI signaling bandwidth, it may be a good engineering tradeoff to impose a single modulation order on the multiple transmit antennas corresponding to the same MCS/CQI signaling. In this case, the JointMCSFormat mapping function takes the highest information rate amongst the permitted modulation orders. That is, the modulation order is also dynamically and implicitly selected by the JointMCSFormat mapping function.

One non-limiting example of the JointMCSFormat mapping function has the following form:

$$MCS = JointMCSFormat(SINR_{MLD,0}, \ldots, SINR_{MLD,N-1}) \qquad \text{Eq. (11)}$$
$$= Summary(MCSFormat(SINR_{MLD,0}), \ldots, MCSFormat(SINR_{MLD,N-1})).$$

That is, the individual $SINR_{MLD,n}$ values are first translated using the MCSFormat mapping function disclosed in the above. The translated values are then summarized into a single MCS/CQI value. If the modulation order is pre-determined, the individual MCSFormat mapping function takes the information rate corresponding to the modulation order at the calculated $SINR_{MLD,n}$ value. Alternatively, full flexibility to use different modulation orders on different transmit antennas can also be supported.

In the third case (L<N MCS/CQI values), a single modulation order can be imposed on the multiple transmit antennas corresponding to the same MCS/CQI to conserve signaling bandwidth. The required translation procedure is as follows. A temporary modulation order is selected from the range of permitted modulation orders. The individual MCSFormat mapping functions are then evaluated based on the temporary modulation order selection. The final modulation order decision is set to the temporary modulation order that gives rise to the highest MCS/CQI level.

One non-limiting exemplary Summary function takes the form of weighting all translated values:

$$MCS = JointMCSFormat(SINR_{MLD,0}, \ldots, SINR_{MLD,N-1}) = \qquad \text{Eq. (12)}$$
$$\sum_{n=0}^{N-1} w_n \times MCSFormat(SINR_{MLD,n}),$$

where $w_n$ is the weight for the nth antenna. One exemplary weight assignment is that $w_n=1/N$ for all $n=0, \ldots, N-1$. Alternatively, uneven weighting may be applied per system setup requirements. To conserve signaling bandwidth, it may be necessary to quantize the summarized value:

$$MCS = JointMCSFormat(SINR_{MLD,0}, \ldots, SINR_{MLD,N-1}) = \qquad \text{Eq. (13)}$$
$$Quantization\left(\sum_{n=0}^{N-1} w_n \times MCSFormat(SINR_{MLD,n})\right).$$

In the third case, the system specifications require the N $SINR_{MLD,n}$ values to be summarized into L MCS/CQI values (with L<N). This is accomplished by breaking the N $SINR_{MLD,n}$ values into L subsets. The SINR values in each subset are then combined using a JointMCSFormat translation function disclosed in the above. In combination with the teaching of minimizing error propagation, L different (and generally decreasing) SINR adjustments should be assigned for the L different SINR subsets:

$$MCS_l = Quantization\left(\sum_{k=n_l}^{n_{l+1}-1} w_n \times MCSFormat(SINR_{MLD,k} - \delta_l)\right), \qquad \text{Eq. (14)}$$

where $\{SINR_{MLD,n_l}, \ldots, SINR_{MLD,n_{l+1}-1}\}$ is the list of SINR for the lth subset and $\delta_0 \geq \delta_1 \geq \ldots \geq \delta_{L-1}$.

In some embodiments, the MU-SIMO and SU-MIMO approaches can be combined to provide flexible balance of system and user throughput. Let M denote the total number of receive antennas at the base station and K denote the total number of sub-carriers allocated to the transmissions. Let U denote the total number of user terminals scheduled to transmit simultaneously on the allocated sub-carriers. For $u=0, \ldots, U-1$, the uth UE transmits its signal with Nu antennas. As mentioned before, we only consider cases where the total number of uplink transmit antennas from all simultaneous scheduled UEs does not exceed to the total number of receive antennas.

The present invention provides a method and apparatus for easily computing the CQI for SLI, AMLD, or other ML, or near ML, receivers in the uplink of LTE. Thus, the present invention allows the base station to schedule a user to use a transmission rate that is more accurately reflecting the receiver capability, taking full advantage of advanced receiver performance.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of computing a signal-to-interference-plus-noise ratio of a signal received on an orthogonal frequency-division multiplexing (OFDM) carrier over a communication channel, said method comprising:
receiving two or more signals-of-interest over a multiple-input, multiple-output channel;
iteratively detecting each signal-of-interest by successive interference cancellation, wherein detecting each signal-of-interest comprises jointly detecting symbols in each signal-of-interest;

computing a signal-to-interference-plus-noise ratio for each signal-of-interest reflecting the remaining interference after cancellation of interference attributable to previously detected signals-of-interest, by:
   computing per-subcarrier signal-to-interference-plus-noise ratios for a plurality of subcarriers allocated to the signal-of-interest;
   computing a total signal-to-interference-plus-noise ratio for the signal-of-interest based on the per-subcarrier signal-to-interference-plus-noise ratios of the subcarriers; and
   determining one or more transmission formats based on the total signal-to-interference-plus-noise ratios for the signals-of-interest.

2. The method of claim 1 wherein computing a total signal-to-interference-plus-noise ratio for the subcarriers based on the per-subcarrier signal-to-interference-plus-noise ratios of the subcarriers comprises:
   computing per-subcarrier capacities for the subcarriers allocated to the signal-of-interest based on the per subcarrier signal to interference ratios;
   computing an average capacity of the subcarriers based on the per-subcarrier capacities for the subcarriers; and
   computing a total signal-to-interference-plus-noise ratio for the subcarriers based on the average capacity of the subcarriers.

3. The method of claim 1 wherein the signals-of-interest is received on multiple antennas and wherein computing per-subcarrier signal-to-interference-plus-noise ratios for a plurality of subcarriers carrying the signal-of-interest comprises combining the contributions of each receive antenna to obtain the per-subcarrier signal-to-interference-plus-noise ratios.

4. The method of claim 3 wherein combining the contributions of each antenna to obtain the per-subcarrier signal-to-interference-plus-noise ratios comprises computing interference correlations across said antennas and combining the contributions of each antenna based on the interference correlations.

5. The method of claim 1 wherein determining one or more transmission formats based on the total signal-to-interference-plus-noise ratios for the signals-of-interest comprises determining a separate transmission format for each signal-of-interest.

6. The method of claim 5 wherein determining one or more transmission formats based on the total signal-to-interference-plus-noise ratios for the signals-of-interest comprises further comprises adjusting the total signal-to-interference-plus-noise ratios to mitigate error propagation.

7. The method of claim 6 wherein adjusting the total signal-to-interference-plus-noise ratios to mitigate error propagation comprises assigning decreasing adjustment values to signal-to-interference-plus-noise ratios depending on the order of detection.

8. The method of claim 1 wherein the signals-of-interest originate from a single user and wherein determining one or more transmission formats based on the total signal-to-interference-plus-noise ratios for the signals-of-interest comprises determining a single transmission format for all signals-of-interest based on the signal-to-interference-plus-noise ratios.

9. The method of claim 8 wherein determining a single transmission format for two or more signals-of-interest comprises determining an individual transmission format for each signal-of-interest and combining the individual transmission formats for two or more signals-of interest to determine the single transmission format.

10. The method of claim 9 wherein combining the individual transmission formats for two or more signals-of-interest to determine the single transmission format comprises computing a weighted average of the individual transmission formats.

11. The method of claim 1 wherein determining one or more transmission formats based on the total signal-to-interference-plus-noise ratios for the signals-of-interest comprises grouping the signals-of interest into two or more groups, and determining a single transmission format for the signals-of-interest in each group.

12. The method of claim 11 wherein determining a single transmission format for the signals-of-interest in each group comprises determining individual transmission formats for the signals-of-interest in at least one group, and combining the individual transmission formats for signals-of-interest in said group to determine the group transmission format.

13. The method of claim 1 wherein iteratively detecting two or more signals-of-interest comprises:
   detecting a first signal-of interest in a received signal;
   cancelling interference attributable to the first signal-of interest from said received signal to generate a modified received signal; and
   detecting a second signal-of interest in the modified received signal.

14. The method of claim 1 wherein the symbols in the signal of interest comprise time-domain symbols processed by a discrete Fourier transform.

15. A receive signal processor for a communications device having one or more receive antennas, said receive signal processor comprising:
   a detector to iteratively detect two or more signals-of-interest in a received signal, wherein symbols in each signal-of-interest are jointly detected; and
   a signal quality estimator, configured to:
   compute a signal-to-interference-plus-noise ratio for the signal-of-interest reflecting interference after cancellation of interference attributable to previously detected signals-of-interest;
   determine a separate transmission format for each signal-of-interest,
   compute per-subcarrier signal-to-interference-plus-noise ratios for a plurality of subcarriers allocated to the signal-of-interest; and
   compute a total signal-to-interference-plus-noise ratio for the subcarriers based on the per-subcarrier signal-to-interference-plus-noise ratios of the subcarriers, by:
      computing per-subcarrier capacities for the subcarriers allocated to the signal-of-interest based on the per subcarrier signal-to-interference-plus-noise ratios;
      computing an average capacity of the subcarriers based on the per-subcarrier capacities for the subcarriers; and
      computing a total signal-to-interference-plus-noise ratio for the subcarriers based on the average capacity of the subcarriers.

16. The receive signal processor of claim 15 wherein the signal-of-interest is received on multiple receive antennas and wherein the signal quality estimator is configured to compute per-subcarrier signal-to-interference-plus-noise ratios for a plurality of subcarriers by combining the contributions of each receive antenna to obtain the per-subcarrier signal-to-interference-plus-noise ratios.

17. The receive signal processor of claim 16 wherein the signal quality estimator is configured to combine the contributions of each antenna to obtain the per-subcarrier signal-to-interference-plus-noise ratios by computing interference correlations across said antennas and combining the contributions of each antenna based on the interference correlations.

18. The receive signal processor of claim 15 wherein the signal quality estimator is configured to adjust the signal-to-interference-plus-noise ratios to mitigate error propagation before determining the transmission formats.

19. The receive signal processor of claim 18 wherein the signal quality estimator is configured to assign decreasing adjustment values to the signal-to-interference-plus-noise ratios depending on the order of detection.

20. The receive signal processor of claim 15 wherein the signals-of-interest originate from a single user and wherein the signal quality estimator is configured to determine a single transmission format for two or more signals-of-interest based on corresponding signal-to-interference-plus-noise ratios.

21. The receive signal processor of claim 20 wherein the signal quality estimator is configured to determine an individual transmission format for each signal-of-interest and to combine the individual transmission formats for two or more signals-of interest to determine the single transmission format.

22. The receive signal processor of claim 21 wherein the signal quality estimator is configured to compute a weighted average of the individual transmission formats to determine the single transmission format.

23. The receive signal processor of claim 15 wherein the signal quality estimator is configured to group the signals-of interest into two or more groups, and to determine a single transmission format for the signals-of-interest in each group.

24. The receive signal processor of claim 23 wherein the signal quality estimator is configured to determine the single transmission format for at least one group by determining individual transmission formats for the signals-of-interest in the group, and combining the individual transmission formats for signals-of-interest in the group to determine the group transmission format.

* * * * *

UNITED STATES PATENT AND TRADEMARK OFFICE
CERTIFICATE OF CORRECTION

PATENT NO. : 8,446,939 B2
APPLICATION NO. : 12/764247
DATED : May 21, 2013
INVENTOR(S) : Wang et al.

Page 1 of 1

It is certified that error appears in the above-identified patent and that said Letters Patent is hereby corrected as shown below:

In the Specification

In Column 7, Lines 32-33, in Eq. (11), delete "$SINR_{MLD,N-1})$" and insert -- $MCS = JointMCSFormat(SINR_{MLD,0}, \ldots, SINR_{MLD,N-1})$ --, therefor.

Signed and Sealed this
First Day of October, 2013

Teresa Stanek Rea
*Deputy Director of the United States Patent and Trademark Office*